UNITED STATES PATENT OFFICE.

THOMAS R. ABBOTT, OF LOWELL, MASSACHUSETTS.

IMPROVEMENT IN COMPOSITION FELTING FOR COVERING ROOFS, SHIPS' BOTTOMS, &c.

Specification forming part of Letters Patent No. 103,536, dated May 31, 1870.

*To all whom it may concern:*

Be it known that I, THOMAS R. ABBOTT, of Lowell, in the county of Middlesex and State of Massachusetts, have invented certain new and useful Improvements in Composition Felting, of which the following is a full, clear, and exact description.

My said invention and improvements in composition felting relate to that kind of felting which is used in sheathing ships—that is, for a strong packing between the planking and the sheathing-boards to prevent leakage; also, the sheet-felting used for covering the roofs of buildings, and for various other purposes where the exclusion of water or dampness is the result or object desired to be attained.

The ingredients of which I make my improved composition felting are petroleum, or other oil, rosin or pitch, silica, or other fine earthy substance, or pulverized stone or mineral, such as pulverized soap-stone, talc, chalk, coal-cinders, iron-slag or silica, and the common impurities usually found with it, or any other equivalent substance which will serve the purpose, as hereinafter described, and hair or other animal fiber, or hemp, Manila, grass, or other vegetable fiber, combined together in the following manner, viz:

First, by preparing a long sheet or bat or lap, say of hair, in the usual way of making hair-felt, or, instead of hair, some kind of vegetable fiber, say fine grass or old grass rope, or Manila rope, opened, picked, and reduced to a condition capable of being formed into a lap or sheet similar to the hair-felting.

Next, I prepare a composition of oil and rosin or pitch, petroleum-oil being preferred. Place in a suitable kettle any desired quantity of such oil, and apply heat in any convenient way, and continue the heat until the temperature of the oil is raised to nearly a boiling-point; then add rosin or pitch, and agitate and continue the heat until the quantity of rosin or pitch dissolved in the oil makes the whole mass about the consistency of thin pine-tar or molasses.

Next, the lap or bat of previously-prepared hair or other animal or vegetable fiber is immersed in or saturated with the heated composition of oil and rosin or pitch, and the pulverized or other fine mineral or earthy substance applied to both sides of the said saturated lap or bat, which, while cooling, is passed several times between pressure-rolls of any common kind, to compress the combined substances, and thus form my improved composition felting.

The fine mineral substance prevents adhesion to the pressing-rolls, and, when finished, renders the composition felting comparatively fire-proof, and in a great measure impervious to water.

The hair or other fibrous substance makes a very strong and tenacious foundation, and the oil and rosin or pitch are admirably adapted to hold all the parts together, possessing peculiar properties which render it capable of resisting the action of heat or cold.

It is somewhat difficult to give the precise quantity or the exact proportions of the oil, the rosin, or pitch, since oils vary in density, and each different kind or lot of oil will generally dissolve a different quantity of rosin or pitch, and, if the latter is used, a greater quantity of it is soluble in almost any kind of oil than the former, and therefore I find that by dissolving and mixing the rosin or the pitch with the oil until the proper consistency is attained, as herein described, I produce a mixture best fitted for saturating the aforesaid fibrous foundation, and for holding all the parts or ingredients together, so as to form or produce a superior composition felting that will resist the action of heat or cold, and that will be impervious to water, as before described.

My said improved composition felting is well adapted for shoe-soles or the outer taps or half-soles applied to boots or shoes when new or when partially worn, portions of such compressed composition felting being cut from the sheet, and of the right form or shape to conform to the shape of the bottom of the shoe, and applied by some of the oil and rosin or pitch composition spread, while heated, on the bottom of the shoe and on one side of the composition felt sole, and this pressed onto the bottom of the shoe thus prepared, and held while the composition cools or hardens.

Such a shoe-sole will cost but a mere trifle, and it will do good service for a limited time, especially in wet or damp weather.

In this invention I do not claim a composition of petroleum and rosin with pulverized soap-stone, as expressed in the patent to Libby and Stimson, August 3, 1869, assigned to me by deed recorded in liber C$^{12}$, page 339, of Transfers of Patents, 1869; nor do I claim the composition of petroleum, rosin or pitch, and silica, as in Patent No. 99,277, issued to me and dated February 1, 1870.

Neither of the above-described compositions is found to possess the necessary properties and qualities to render it in any sense the equal or equivalent to the composition I have described as my present invention for composition felting.

What I claim in this invention, and which I desire to secure by Letters Patent, is—

A composition felting, as described, the same consisting of a sheet, lap, or bat of animal or vegetable fibers, or their specified equivalent, saturated with a composition of oil and rosin or pitch, as set forth, and earthy or mineral substance or silica, all combined substantially in the manner and for the purposes described.

THOMAS R. ABBOTT.

Witnesses:
JOHN E. CRANE,
A. A. HART.